US009015681B1

(12) United States Patent
Bryan et al.

(10) Patent No.: US 9,015,681 B1
(45) Date of Patent: Apr. 21, 2015

(54) CREATING AND USING ARRAY CREATION ROUTINES OR A FAMILY OF ROUTINES SEPARATE FROM ALGORITHMIC CODE

(71) Applicant: The Mathworks, Inc., Natick, MA (US)

(72) Inventors: Thomas A. Bryan, Westborough, MA (US); Julia Wilder Palmateer, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/826,957

(22) Filed: Mar. 14, 2013

Related U.S. Application Data

(63) Continuation-in-part of application No. 13/572,389, filed on Aug. 10, 2012, and a continuation-in-part of application No. 13/572,386, filed on Aug. 10, 2012.

(60) Provisional application No. 61/682,048, filed on Aug. 10, 2012.

(51) Int. Cl.
*G06F 9/45* (2006.01)
*G06F 7/57* (2006.01)

(52) U.S. Cl.
CPC ...... *G06F 8/43* (2013.01); *G06F 7/57* (2013.01)

(58) Field of Classification Search
CPC ......... G06F 21/31; G06F 21/60; G06F 21/36; G06F 21/566; G06F 21/62; G06F 21/10; G06F 21/50; G06F 21/554; G06F 21/56; G06F 21/561; G06F 21/562
USPC .................................................. 717/140, 141
See application file for complete search history.

(56) References Cited

U.S. PATENT DOCUMENTS

| 5,295,256 A | 3/1994 | Bapat |
| 5,675,714 A | 10/1997 | Kato |
| 5,732,273 A | 3/1998 | Srivastava et al. |
| 6,085,035 A | 7/2000 | Ungar |
| 6,857,119 B1 | 2/2005 | Desai |
| 7,000,227 B1 | 2/2006 | Henry |
| 7,971,194 B1 * | 6/2011 | Gilboa .......................... 717/136 |
| 8,006,243 B2 | 8/2011 | Lum |
| 8,042,102 B2 | 10/2011 | Dewitt et al. |

(Continued)

OTHER PUBLICATIONS

Berman et al., The Grads Project: Software Support for High-Level Grid Application Development, The Internatinoal Journal of High Performance Computing Applications, vol. 15, No. 4, Winter 2001, pp. 327-344.*

(Continued)

*Primary Examiner* — Don Wong
*Assistant Examiner* — Reshaun M Finkley
(74) *Attorney, Agent, or Firm* — Harrity & Harrity, LLP (57) ABSTRACT

A device obtains first program code that identifies a function, an input argument to which the function is to be applied when the first program code is executed, and a class identifier that identifies second program code that includes a set of routines. The set of routines includes a routine that identifies a manner in which a return value of the function is to be generated, when the first program code is executed. The second program code is stored separately from the first program code. The device executes the first program code, obtains the second program code based on executing the first program code, and executes the routine to generate the return value, based on the function, the input argument, and the class identifier. The device provides the return value.

20 Claims, 9 Drawing Sheets

(56) References Cited

U.S. PATENT DOCUMENTS

| | | | |
|---|---|---|---|
| 8,161,463 | B2 | 4/2012 | Johnson et al. |
| 8,166,465 | B2 | 4/2012 | Feblowitz et al. |
| 8,176,475 | B2 | 5/2012 | Kosche et al. |
| 8,402,435 | B1 | 3/2013 | Spiro |
| 2003/0145312 | A1 | 7/2003 | Bates et al. |
| 2005/0039177 | A1 | 2/2005 | Burke |
| 2006/0036656 | A1 | 2/2006 | Mercer |
| 2007/0033576 | A1 | 2/2007 | Tillmann et al. |
| 2007/0294704 | A1* | 12/2007 | Stephen et al. ............... 719/315 |
| 2008/0036783 | A1 | 2/2008 | Kulkarni |
| 2008/0222616 | A1* | 9/2008 | Cheng et al. .................. 717/137 |
| 2008/0240039 | A1 | 10/2008 | Parekh et al. |
| 2008/0270993 | A1 | 10/2008 | Tateishi et al. |
| 2009/0024802 | A1* | 1/2009 | Yeh ............................. 711/147 |
| 2009/0125796 | A1 | 5/2009 | Day et al. |
| 2009/0222798 | A1* | 9/2009 | Iguchi et al. .................. 717/137 |
| 2011/0010690 | A1 | 1/2011 | Howard et al. |
| 2011/0055806 | A1 | 3/2011 | Chicherin et al. |
| 2013/0027230 | A1 | 1/2013 | Marpe et al. |
| 2013/0239099 | A1* | 9/2013 | Kruglick ...................... 717/140 |

OTHER PUBLICATIONS

Notification of Transmittal of the International Search Report and the Written Opinion of the International Searching Authority, or the Declaration corresponding to PCT/US2013/053588, mailed Nov. 14, 2013, 10 pages.

"Generics in Java—Wikipedia, the free encyclopedia", Aug. 9, 2012, XP055086281, http://en.wikipedia.org/w/index.php?title_Generics_in_Java&oldid=506514772, 8 pages.

"Generic programming—Wikipedia, the free encyclopedia", Aug. 8, 2012, XP055086285, http://en.wikipedia.org/w/index.php?title_Generic_programming&oldid=506450229, 22 pages.

Co-pending U.S. Appl. No. 13/572,386 entitled "A Mechanism for Replacing an Array Creation Routine within Code", filed Aug. 10, 2012, by Bryan et al., 92 pages.

Co-pending U.S. Appl. No. 13/572,389 entitled "A Mechanism for Transforming Between Type-Independent and Type-Specific Code", filed Aug. 10, 2012, by Palmateer et al., 83 pages.

* cited by examiner

CREATING AND USING ARRAY CREATION ROUTINES OR A FAMILY OF ROUTINES SEPARATE FROM ALGORITHMIC CODE

RELATED APPLICATIONS

This application claims priority under 35 U.S.C. §119 based on U.S. Provisional Patent Application No. 61/682,048, filed on Aug. 10, 2012, the content of which is incorporated by reference herein in its entirety. This application is also a continuation-in-part (CIP) of U.S. patent application Ser. No. 13/572,389, filed on Aug. 10, 2012, the content of which is incorporated by reference herein in its entirety. This application is also a continuation-in-part (CIP) of U.S. patent application Ser. No. 13/572,386, filed on Aug. 10, 2012, the content of which is incorporated by reference herein in its entirety.

DETAILED DESCRIPTION

The following detailed description of example implementations refers to the accompanying drawings. The same reference numbers in different drawings may identify the same or similar elements.

A computer programmer may want to create program code that can be used by multiple different devices, such as devices with different types or amounts of computing resources (e.g., memory, processor type, processor speed, etc.). The different devices may use different data types (e.g., an integer data type, a fixed point data type, a floating point data type, etc.) and/or different algorithms (e.g., an approximation algorithm, a table lookup algorithm, etc.) when executing a function included in the program code. The computer programmer may find it difficult to create program code that meets the needs of a wide variety of devices, and such program code may waste computing resources by including a large amount of program code (e.g., for each data type and each algorithm that may be used by each device). Implementations described herein allow a computer programmer to create program code that can be executed by a large number of devices by separating functions, included in the program code, from routines that specify a data type and/or an algorithm to use when executing the functions.

Figure 1:
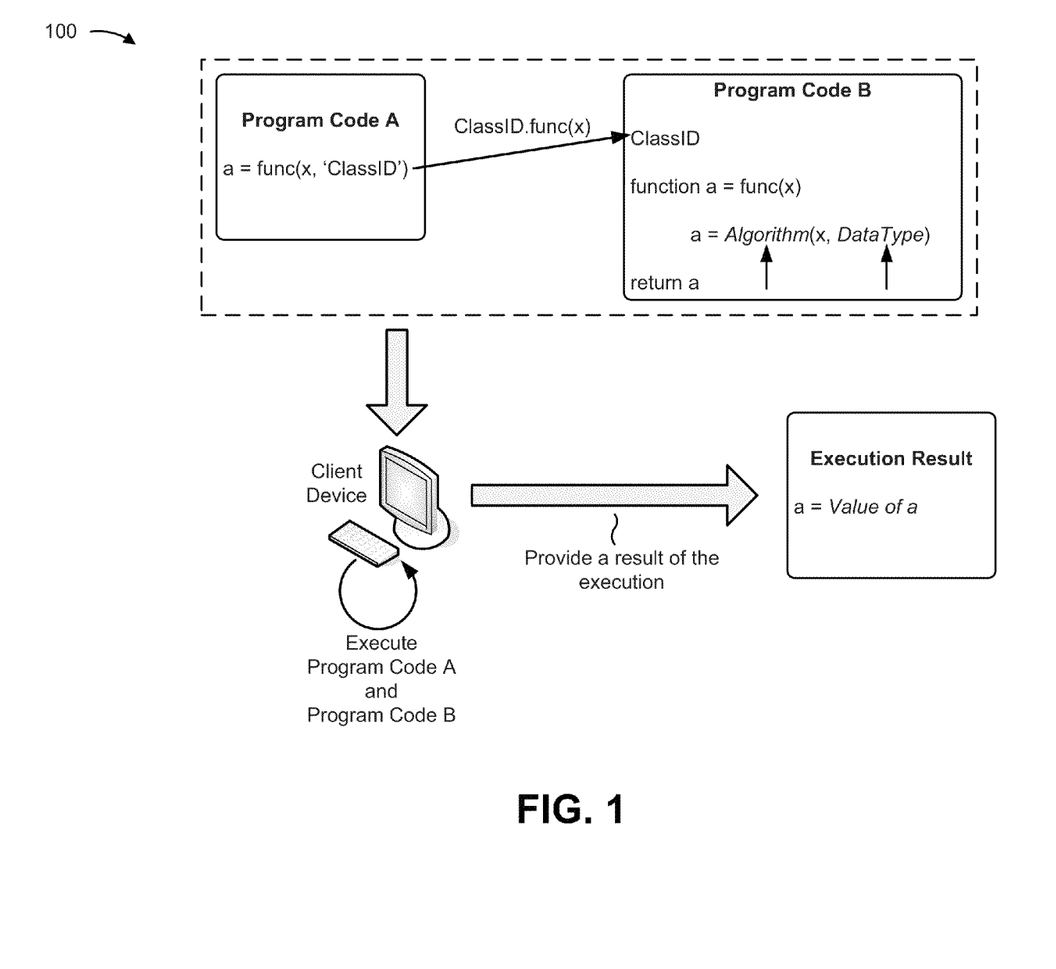
FIG. 1 is a diagram of an overview of an example implementation described herein.

FIG. 1 is a diagram of an overview of an example implementation 100 described herein. As shown, implementation 100 may include a client device (such as a computer) that reads, processes, and/or executes program code (e.g., Program Code A and Program Code B) to generate a result (e.g., Execution Result).

The program code may include separate program code, such as program code stored in separate files. First program code, shown as Program Code A, may include a function (e.g., func), an input argument (e.g., x) to which the function is to be applied, and a class identifier (e.g., 'ClassID') that identifies second program code, shown as Program Code B. Program Code B may include a routine that defines an algorithm (e.g., Algorithm) and/or a data type (e.g., DataType) to be used when the function is executed (e.g., applied to the input argument).

As shown in FIG. 1, the client device may receive Program Code A and Program Code B, such as by retrieving the program code from memory. The client device may execute Program Code A and Program Code B, and may provide a result of the execution. For example, the client device may execute a line of program code, in Program Code A, that includes the function, the input argument, and the class identifier (e.g., a=func(x, 'ClassID'). Executing this line of code may cause the client device to retrieve Program Code B, which includes program code identified by the class identifier (e.g., ClassID). In some implementations, the client device may rearrange the line of code for execution. For example, the client device may rearrange func(x, 'ClassID') to ClassID.func(x), as shown.

Once the client device has retrieved Program Code B, the client device may identify a routine, included in Program Code B, that corresponds to the function executed in Program Code A. For example, in Program Code B, the function func(x), in the class ClassID, may identify a routine corresponding to the function a=func(x, 'ClassID') in Program Code A. The identified routine may include an algorithm and/or a data type to be used when applying the function (e.g., func) to the input argument (e.g., x). For example, the identified routine may include the code a=Algorithm(x, DataType), where Algorithm identifies the algorithm to be performed on input argument x, and DataType identifies a data type to use for input argument x. The client device may execute the routine by converting the input argument x to the identified data type, and by applying the identified algorithm to the converted input argument. The client device may generate a return value (e.g., a value for the variable a) by applying the algorithm to the converted input argument. The algorithm may generate return value a as a same data type as input argument x, in some implementations.

The client device may provide a result of executing the function and/or the routine (e.g., in Program Code A and Program Code B), such as by providing the return value via a user interface. In some implementations, Program Code A may include program code that modifies the return value to generate an output value (e.g., an output argument). The client device may provide the output value via the user interface. Additionally, or alternatively, the client device may further process the return value or the output value, such as by executing additional program code based on the return/output value, and may provide a result of the further processing. In some implementations, the client device may provide the result, the return value, and/or the output value to another device for processing. By storing and executing program code in this manner, the client device may enable a computer programmer to create program code that may be used in a variety of situations and/or on a variety of devices.

Figure 2:
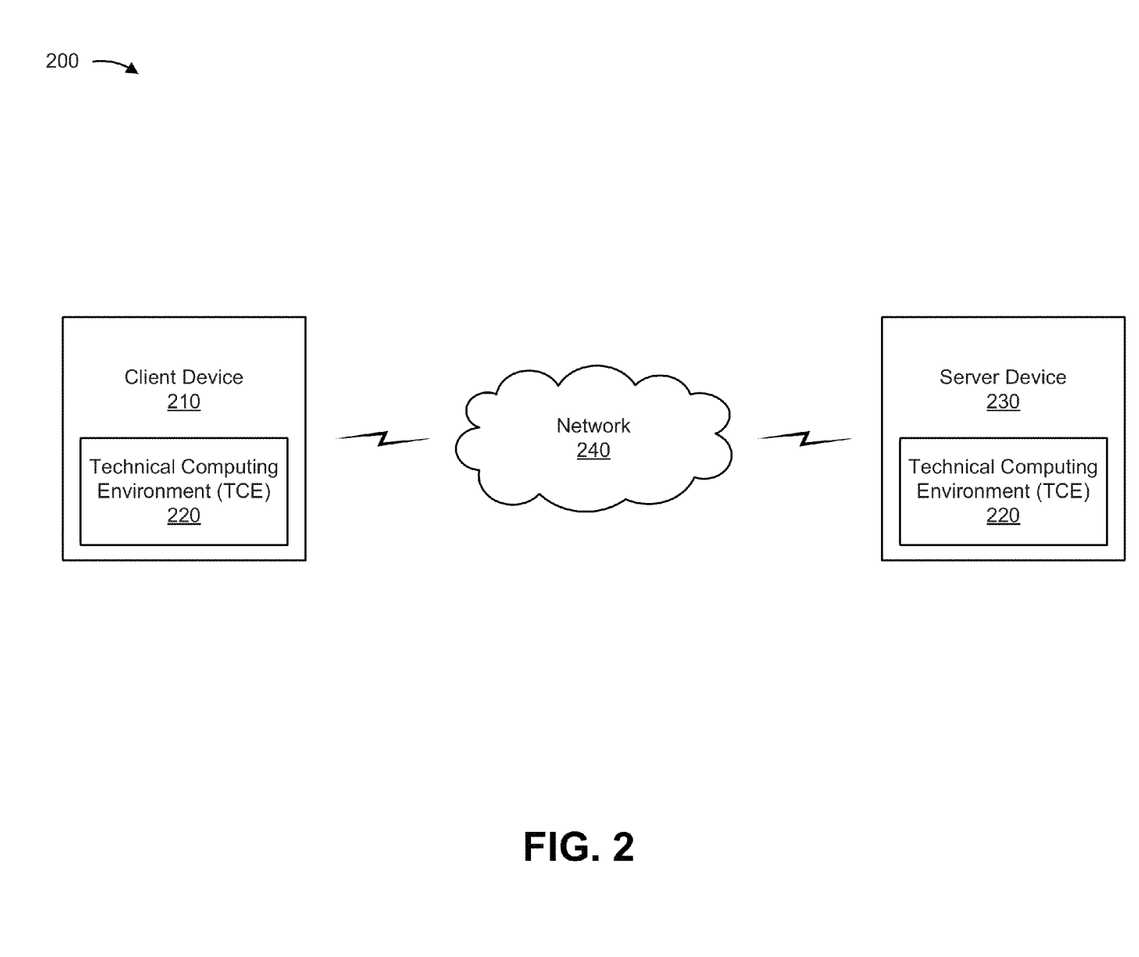
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include a device capable of receiving, generating, storing, processing, executing, and/or providing program code and/or information associated with program code. For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 230 (e.g., program code and/or information associated with program code).

Client device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

In some implementations, the text-based environment may include a dynamically typed language that may be used to express problems and/or solutions in mathematical notations. For example, the text-based environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array, i.e., scalar operations.

Server device 230 may include one or more devices capable of receiving, generating, storing, processing, executing, and/or providing program code and/or information associated with program code. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional, fewer, different, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
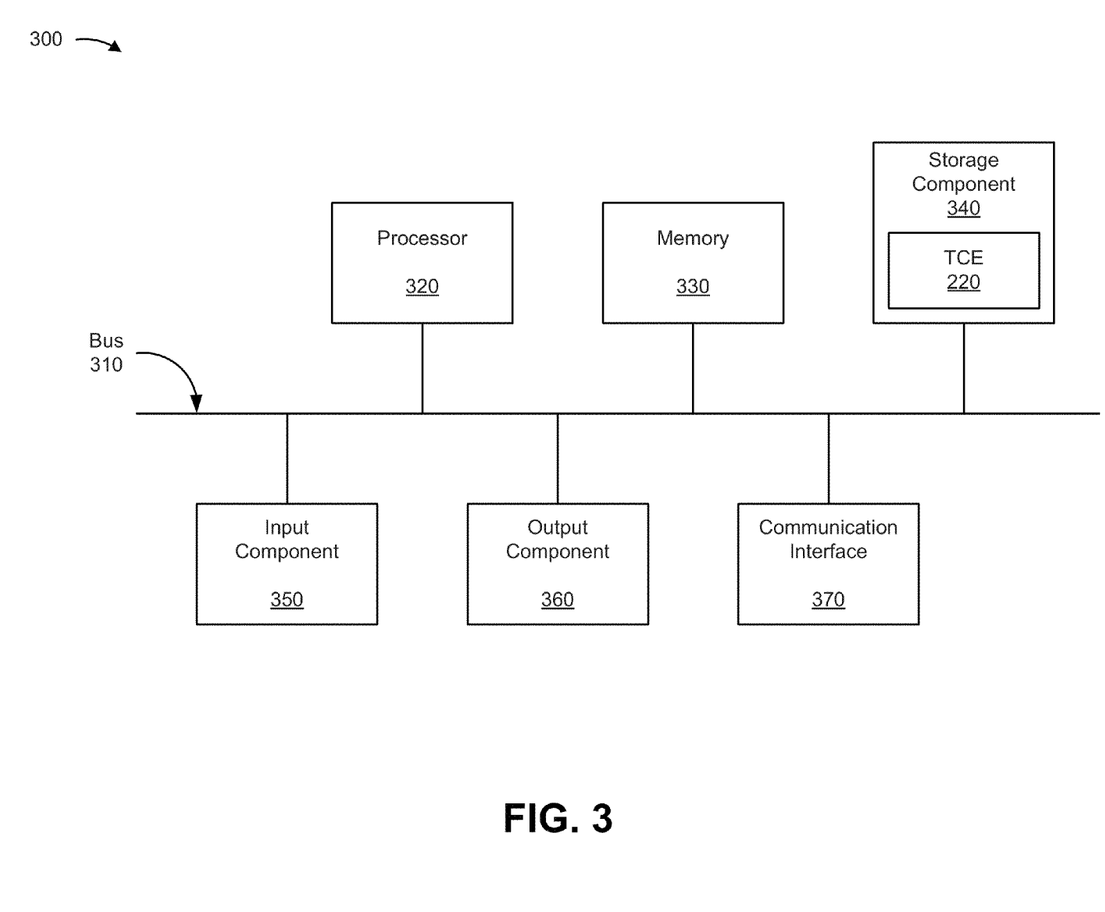
FIG. 3 is a diagram of example components of one or more devices of FIG. 2.

FIG. 3 is a diagram of example components of a device 300, which may correspond to client device 210 and/or server device 230. In some implementations, each of client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

Figure 4:
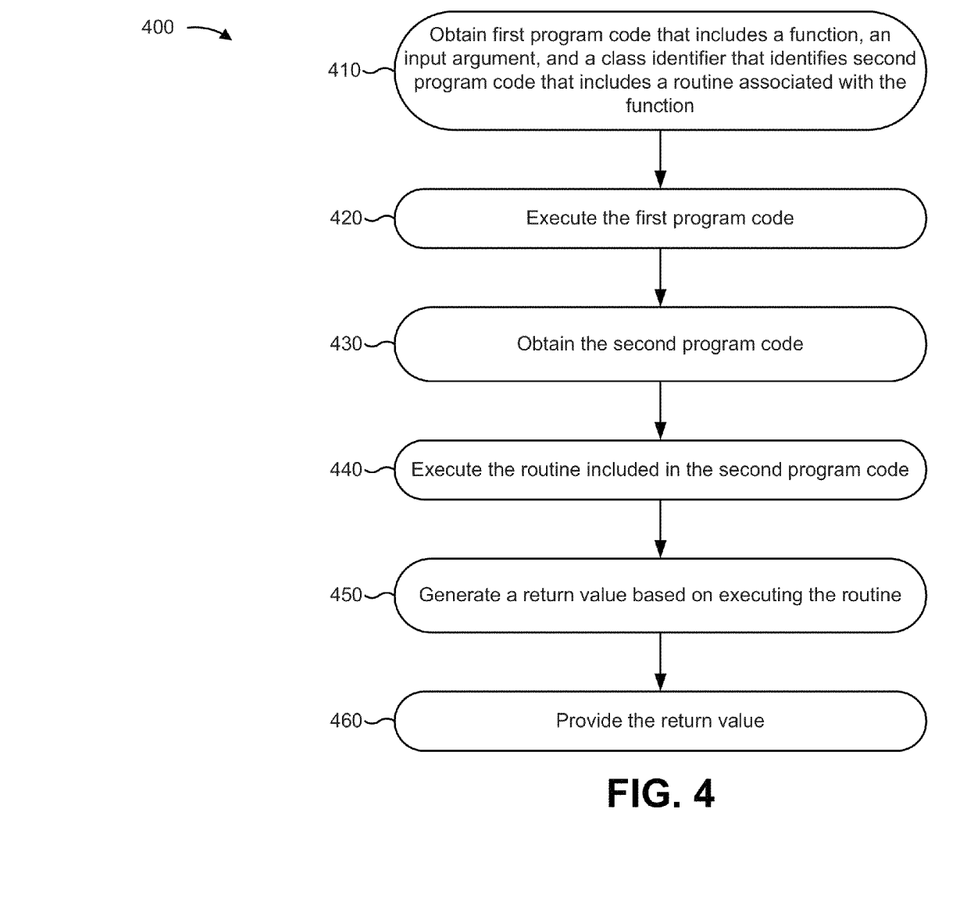
FIG. 4 is a flow chart of an example process for using a routine separate from a function to generate a return value of the function.

FIG. 4 is a flow chart of an example process 400 for using a routine separate from a function to generate a return value of the function. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include obtaining first program code that includes a function, an input argument, and a class identifier that identifies second program code that includes a routine associated with the function (block 410). For example, client device 210 may receive a request (e.g., from a user and/or from another device) to execute the first program code. The request may include information identifying a memory location at which the first program code is stored. The memory location may be located within client device 210 or external to, and possibly remote from, client device 210. Client device 210 may, based on receiving the request, retrieve the first program code from the memory location. The first program code may include multiple files storing program code, a single file storing program code, a portion of a file storing program code, multiple lines of program code, a single line of program code, a portion of a line of program code, a code statement, etc.

The first program code may include a function (e.g., a procedure, a subroutine, a subprogram, a method, etc.), an input argument (e.g., a variable), and a class identifier (e.g., an identification of second program code). The function may perform an operation defined by a sequence of program code statements. The function may perform the operation on the input argument, and may return a result of performing the operation on the input argument as a return value. The function may perform the operation in a manner defined by a routine identified by the class identifier and/or the function (e.g., a routine included in the second program code identified by the class identifier). In some implementations, the class identifier may identify a class and/or may include an instance of a class, and the class may be included in the second program code.

The routine may describe an algorithm to be performed, by the function, on the input argument. The algorithm may include, for example, a step or a sequence of steps that modify the input argument to generate the return value. The algorithm may include, for example, performing a mathematical operation (e.g., an arithmetic operation, a trigonometric operation, a logarithmic operation, an algebraic operation, a calculus operation, etc.) and/or performing an approximation of a mathematical operation (e.g., a polynomial approximation, a rational function approximation, a table lookup approximation, a regression analysis, etc.).

Additionally, or alternatively, the routine may define a data type for the input argument and/or the return value. A data type, as used herein, may refer to a classification, identifying one of various types of data, that determines the possible values for that type, the operations that can be performed on values of that type, the meaning of the data, and/or the manner in which values of that type can be stored. Example data types include an integer data type (e.g., an 8-bit, 16-bit, 32-bit, 64-bit, etc. signed or unsigned integer data type), a real-valued data type, a fixed point data type, a floating point data type, a Boolean data type, a graphics processing unit (GPU) data type (e.g., a GPU array), a symbolic data type (e.g., that recognizes symbols, such as pi, e, etc. as values), an enumerated data type, a single precision data type, a double precision data type, and/or an array data type.

Additionally, or alternatively, the routine may generate an array of values (e.g., a one-dimensional array, a multi-dimensional array, etc.), for the return value, based on the input argument and the algorithm.

In some implementations, client device 210 may determine the routine to be used to execute the function by generating or selecting a class identifier that identifies second program code that includes the routine. Client device 210 may generate or select the class identifier based on a type of client device 210 (e.g., a device type), an amount of computing resources available to client device 210, etc. For example, a first client device 210 with a relatively small amount of computing power (e.g., a watch, a basic calculator, etc.) may use a routine that requires less computing power than a second client device 210 with a relatively large amount of computing power (e.g., a supercomputer).

Additionally, or alternatively, client device 210 may transmit information associated with client device 210 (e.g., a type of client device 210, an amount of computing resources available to client device 210, etc.) to server device 230. Based on the received information, server device 230 may transmit, to client device 210, second program code and/or a class identifier that identifies the second program code.

As an example, a watch with low computing power may execute the first program code, and may select a first class identifier (e.g., 'LowPower') based on characteristics associated with the watch. The watch may obtain second program code (e.g., from memory or from server device 230) based on the 'LowPower' class identifier. The 'LowPower' class in the second program code may include a computationally-light algorithm for executing the function. In this manner, the watch may use a small amount of computing power when executing the function as compared to the amount of power required to execute the function without using the 'LowPower' class.

Similarly, a supercomputer with high computing power may execute the first program code, and may select a second class identifier (e.g., 'HighPower') based on characteristics associated with the supercomputer. The supercomputer may obtain second program code (e.g., from memory or from server device 230) based on the 'HighPower' class identifier. The 'HighPower' class in the second program code may include a computationally-heavy algorithm for executing the function. In this manner, the supercomputer may use a large amount of computing power when executing the function (and may calculate a more accurate result).

As further shown in FIG. 4, process 400 may include executing the first program code (block 420), and obtaining the second program code (block 430). For example, client device 210 may execute the obtained first program code. The class identifier, included in the first program code, may identify the second program code. When executing the first program code, client device 210 may determine the second program code identified by the class identifier, and may obtain the second program code (e.g., to be executed).

In some implementations, the class identifier may identify the second program code (e.g., a name associated with the second program code), and/or may identify a memory location at which the second program code is stored. The memory location may be located within client device 210 or external to, and possibly remote from, client device 210. Client device 210 may, based on executing the first program code, retrieve the second program code from the memory location. The second program code may include multiple files storing program code, a single file storing program code, a portion of a file storing program code, multiple lines of program code, a single line of program code, a portion of a line of program code, a code statement, etc.

The second program code may be different from the first program code. For example, the second program code may be stored in a different memory location than the first program code (e.g., within client device 210 or external to, and possibly remote from, client device 210), may be stored in a different file than the first program code, may be stored in a different portion of a file than the first program code, etc.

The second program code may include a routine associated with the function, as described above with respect to block 410. Additionally, or alternatively, the second program code may include a set of routines (e.g., a related set, or a family, of routines) that includes the routine associated with the function. In some implementations, the set of routines may be related. For example, the set of routines may describe related algorithms for performing different functions. The related algorithms may include, for example, a set of polynomial approximation algorithms for different functions, a set of table lookup algorithms for different functions, a set of regression analysis algorithms for different functions, etc.

As further shown in FIG. 4, process 400 may include executing the routine included in the second program code (block 440), and generating a return value based on executing the routine (block 450). For example, client device 210 may execute the routine included in the obtained second program code. The class identifier in the first program code may identify the second program code, and the function in the first program code may identify and/or correspond to the routine. In some implementations, the function and the routine may be identified using the same name in the first program code and the second program code.

Client device 210 may generate the return value by applying an algorithm, described by the routine, to the input argument (e.g., included in the first program code). The algorithm may include a step or a sequence of steps that modify the input argument to generate the return value. In some implementations, the algorithm may designate a data type for the input argument and/or the return value. Additionally, or alternatively, the return value may include an array of values (e.g., of a particular data type), generated by the algorithm, based on the input argument.

As further shown in FIG. 4, process 400 may include providing the return value (block 460). For example, client device 210 may provide the return value for further processing (e.g., based on further execution of the first program code and/or another program code). In some implementations, the first program code may include program code that modifies the return value to generate an output value (e.g., an output argument). For example, the first program code may include the program code:

a=2*func(x, 'ClassID').

A routine (e.g., associated with func), included in the second program code (e.g., identified by ClassID), may provide a return value for the input argument x by applying an algorithm to x. The first program code may multiply the return value by two (2) to generate an output value for the variable a.

In some implementations, client device 210 may provide, for display, a user interface that depicts a result of executing the first and/or second program code, such as the return value or the output value, or information associated with the return value or the output value. Additionally, or alternatively, client device 210 may further process the return value and/or the output value, such as by executing additional program code based on the return value and/or the output value, and may provide a result of the further processing. In some implementations, client device 210 may provide the result, the return value, and/or the output value to another device for processing. In some implementations, the other device may be associated with the class identifier and/or the executed routine.

While a series of blocks has been described with regard to FIG. 4, the blocks and/or the order of the blocks may be modified in some implementations. Additionally, or alternatively, non-dependent blocks may be performed in parallel.

Figure 5:
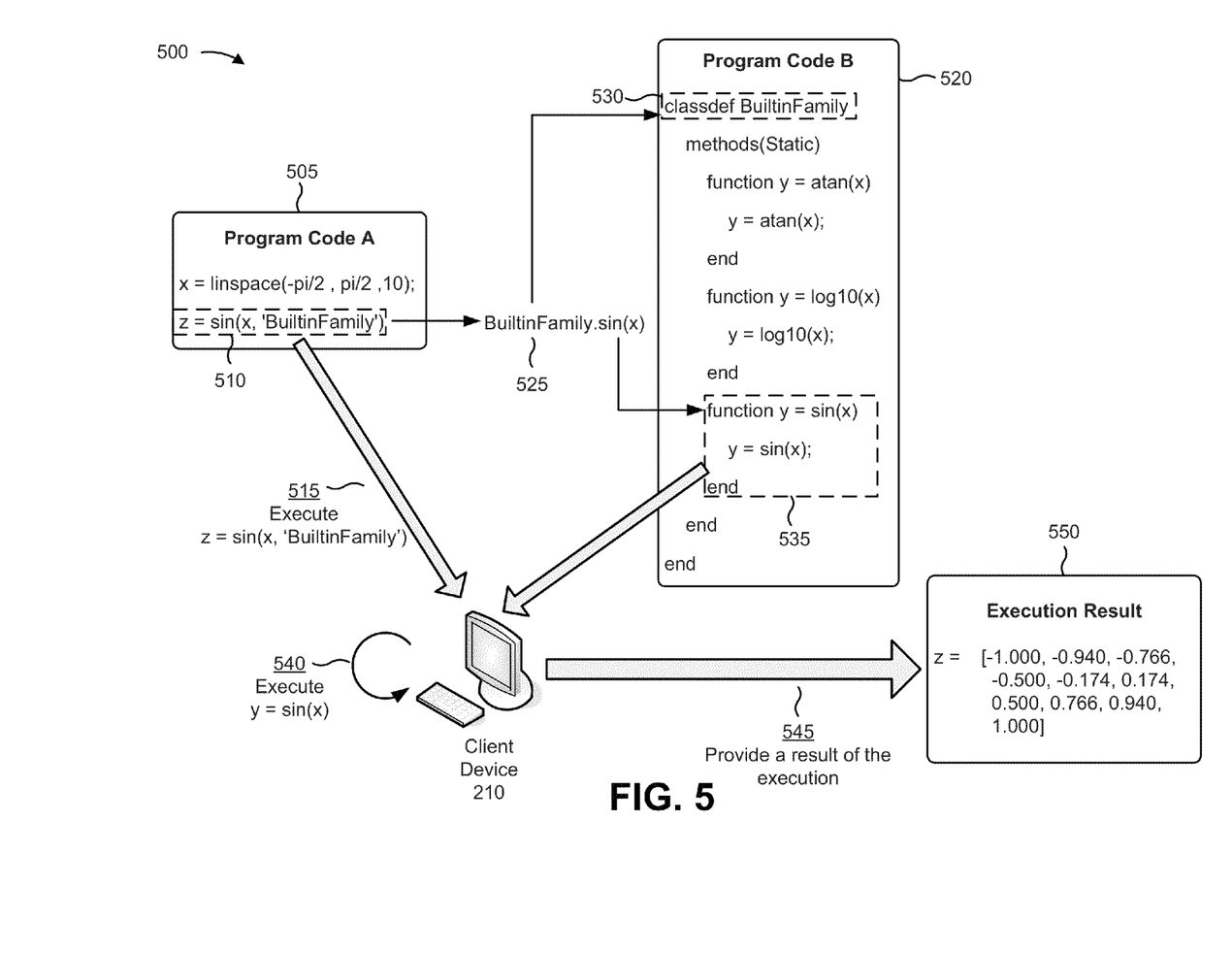
FIG. 5 is a diagram of an example implementation relating to the example process shown in FIG. 4.

FIG. 5 is a diagram of an example implementation 500 relating to example process 400 shown in FIG. 4. Implementation 500 shows an example of first program code and second program code (e.g., Program Code A and Program Code B) that may be executed by client device 210 to generate a result.

As shown in FIG. 5, client device 210 may obtain first code 505 (e.g., first program code), shown as Program Code A. Assume that Program Code A includes the following code statement:

x=linspace(−pi/2, pi/2, 10), which may populate variable x with an array of ten (10) values evenly spaced between negative pi over two (−pi/2) and pi over two (pi/2), inclusive.

Further assume that Program Code A includes code statement 510, which includes a function (sin), an input argument (x) and a class identifier ('BuiltinFamily'), represented as follows:

z=sin(x, BuiltinFamily).

As shown by reference number 515, client device 210 may execute code statement 510, which may cause client device 210 to obtain second code 520 (e.g., second program code), shown as Program Code B. Client device 210 may convert code statement 510 to code statement 525, BuiltinFamily.sin (x), to call the sin routine in the BuiltinFamily class of second code 520. For example, the BuiltinFamily class identifier may identify the BuiltinFamily class of second code 520 (e.g., classdef BuiltinFamily), as shown by code statement 530. Further, the sin function may identify the sin routine of second code 520 (e.g., function y=sin(x)), as shown by code statement 535.

As shown by reference number 540, client device 210 may execute code statement 535, represented as:

function y=sin(x)
   y=sin(x)
end.

As shown by reference number 545, client device 210 may provide a result of the execution (e.g., execution of first code 505 and second code 520, and/or execution of code statement 510 and code statement 535). For example, client device 210 may provide a value for the variable z, via a user interface, as shown by reference number 550. As shown, z may be represented as an array of ten values that represent the sine of the ten evenly spaced values of the array represented by the input argument x. As shown, an output for z may be represented as:

z=[−1.000, −0.940, −0.766, −0.500, −0.174, 0.174, 0.500, 0.766, 0.940, 1.000].

While the BuiltinFamily class of implementation 500 uses a default routine and/or a default data type to generate values corresponding to the sine of x (e.g., y=sin(x)), another class called by code statement 510 (e.g., an approximation class) may use a different (e.g. non-default) routine and/or a different (e.g., non-default) data type to generate the values corresponding to the sine of x.

Figure 6A:
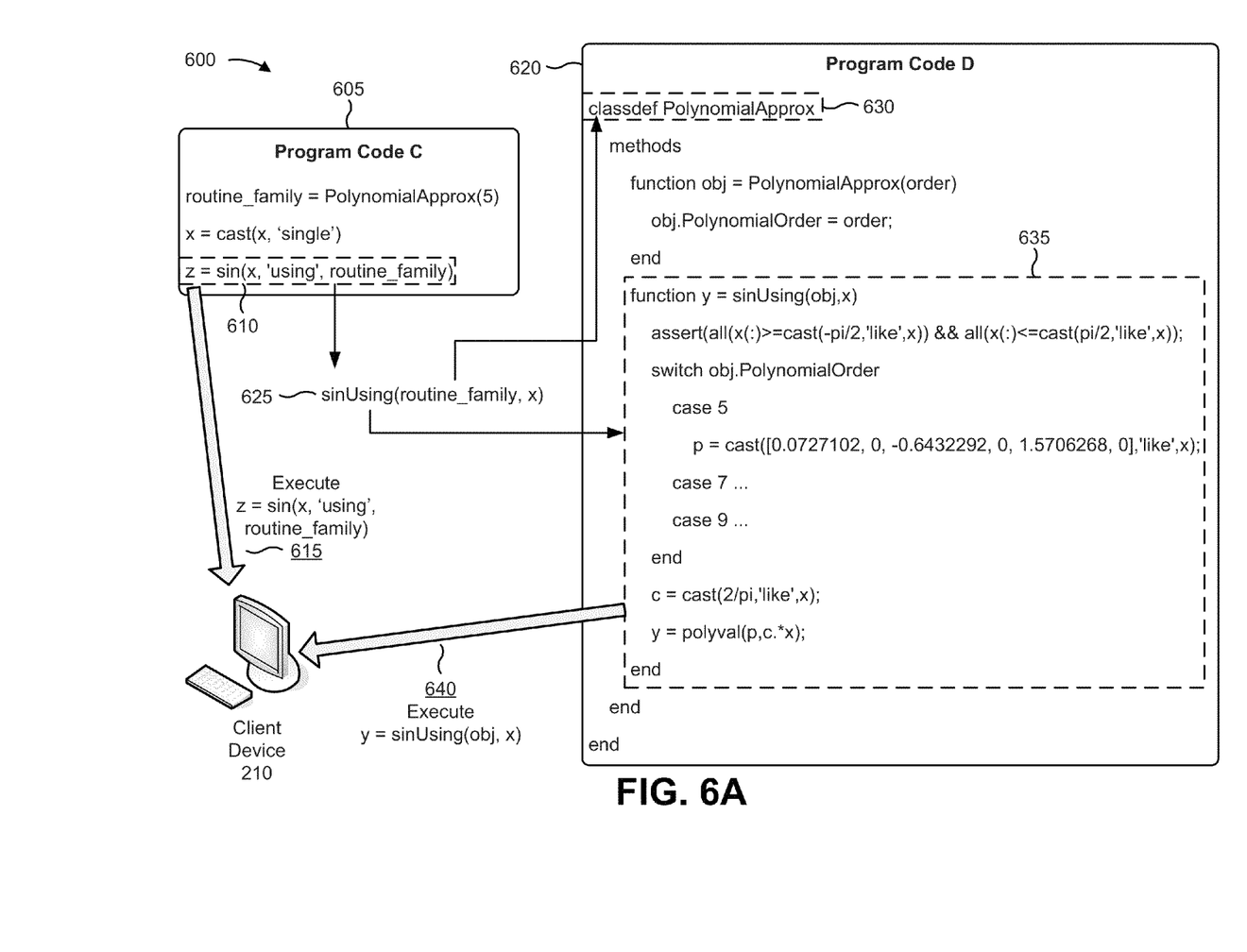
FIGS. 6A and 6B are diagrams of another example implementation relating to the example process shown in FIG. 4.
Figure 6B:
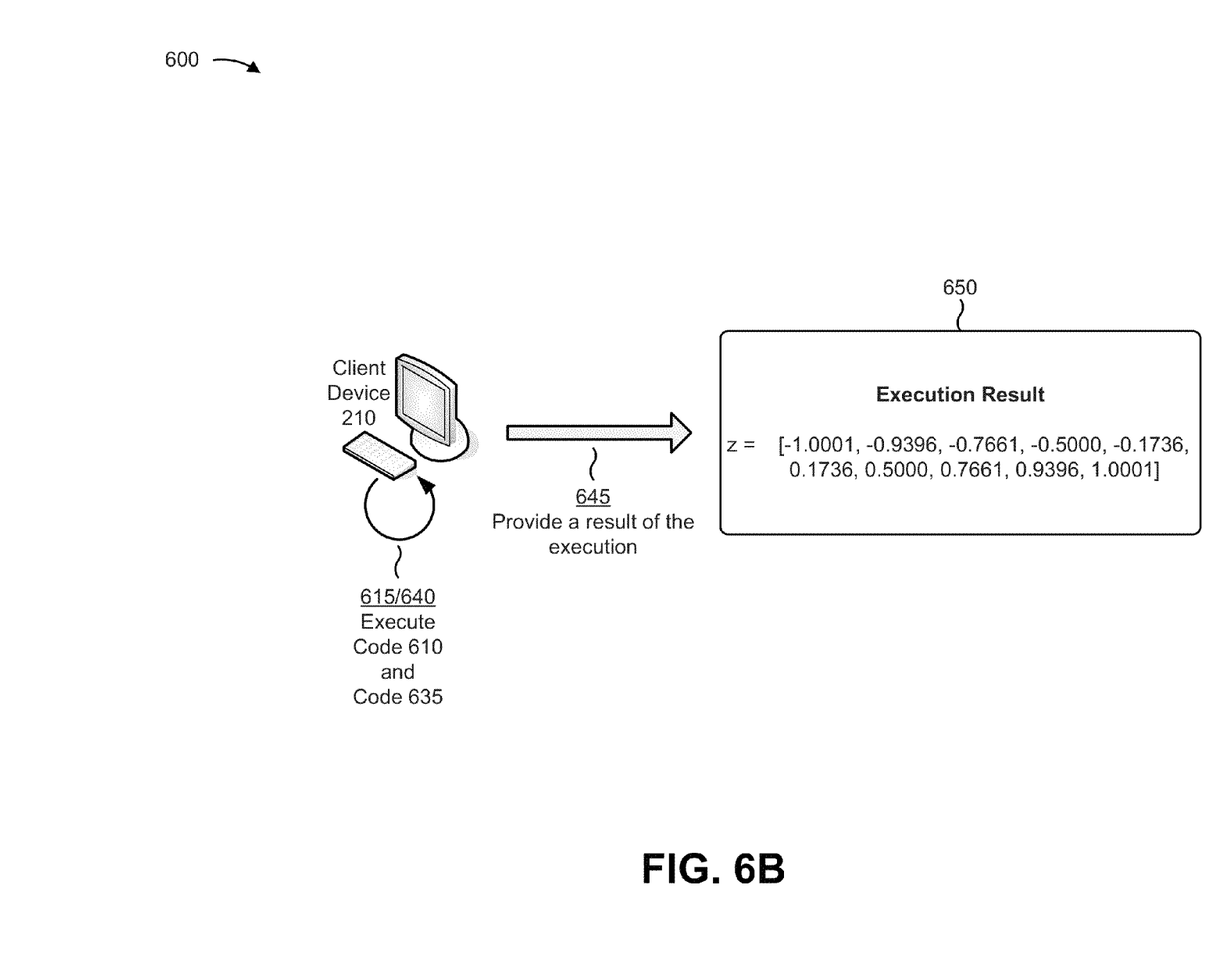

FIGS. 6A and 6B are diagrams of another example implementation 600 relating to example process 400 shown in FIG. 4. Implementation 600 shows another example of first program code and second program code (e.g., Program Code C and Program Code D) that may be executed by client device 210 to generate a result.

As shown in FIG. 6A, client device 210 may obtain first code 605 (e.g., first program code), shown as Program Code C. Assume that Program Code C includes the following code statement:

routine_family=PolynomialApprox(5), which may store an instance of the PolynomialApprox class in the variable routine_family. The stored instance may represent a fifth-order polynomial approximation, based on the argument five (5) appearing in parenthesis after the PolynomialApprox class.

Further assume that Program Code C includes the following code statement:

x=cast(x, 'single'), which may convert variable x to a single precision data type.

Further assume that Program Code C includes code statement 610, which includes a function (sin), an input argument (x), a sentinel ('using') and a class identifier (routine_family), which represents an instance of class PolynomialApprox. The sentinel may separate the input argument from the class identifier, and may identify that the next argument (e.g., routine_family) is a class identifier that identifies the second program code. The sentinel may include other syntax (e.g., 'like'), in some implementations. Code statement 610 may be represented as follows:

z=sin(x, 'using', routine_family).

As shown by reference number 615, client device 210 may execute code statement 610, which may cause client device 210 to obtain second code 620 (e.g., second program code), shown as Program Code D. Client device 210 may convert code statement 610 to code statement 625, sin Using(routine_family, x), to call the sinUsing routine in the PolynomialApprox class (e.g., of which routine_family is a class instance) of second code 620. For example, the routine_family class identifier may identify the PolynomialApprox class of second code 620 (e.g., classdef PolynomialApprox), as shown by code statement 630. Further, the sin and/or sinUsing function may identify the sinUsing routine of second code 620 (e.g., function y=sinUsing(obj, x)), as shown by code statement 635.

As shown by reference number 640, client device 210 may execute code statement 635, represented as:

function y=sinUsing(obj,x)
assert(all(x(:)>=cast(-pi/2,'like',x)) && all(x(:)<=cast (pi/2,'like',x));
switch obj.PolynomialOrder
  case 5
    p=cast([0.0727102, 0, -0.6432292, 0, 1.5706268, 0], 'like', x);
  end
c=cast(2/pi, 'like',x);
y=polyval(p,c.*x);
end.

As shown in FIG. 6B (reference number 645), client device 210 may provide a result of the execution. For example, execution of code statements 610 and 635 may provide a polynomial approximation for values of the sine function computed for the ten evenly spaced values of the array represented by the input argument x. Additionally, the execution may ensure that the polynomial approximation values are the same data type as x (e.g., single precision data type), based on the program code p=cast([ . . . ], 'like', x). As shown by reference number 650, the values of the polynomial approximation may be represented by the variable z. As shown, an output for z may be represented as:

z=[1.0001, -0.9396, -0.7661, -0.5000, -0.1736, 0.1736, 0.5000, 0.7661, 0.9396, 1.0001].

While the routine_family instance of the PolynomialApprox class of implementation 600 uses a fifth-order polynomial approximation routine to generate values corresponding to the sine of x, another class instance called by code statement 610 may use different order polynomial approximation routines. Additionally, or alternatively, a different class called by code statement 610 may use a different routine to generate the values corresponding to the sine of x.

Figure 7A:
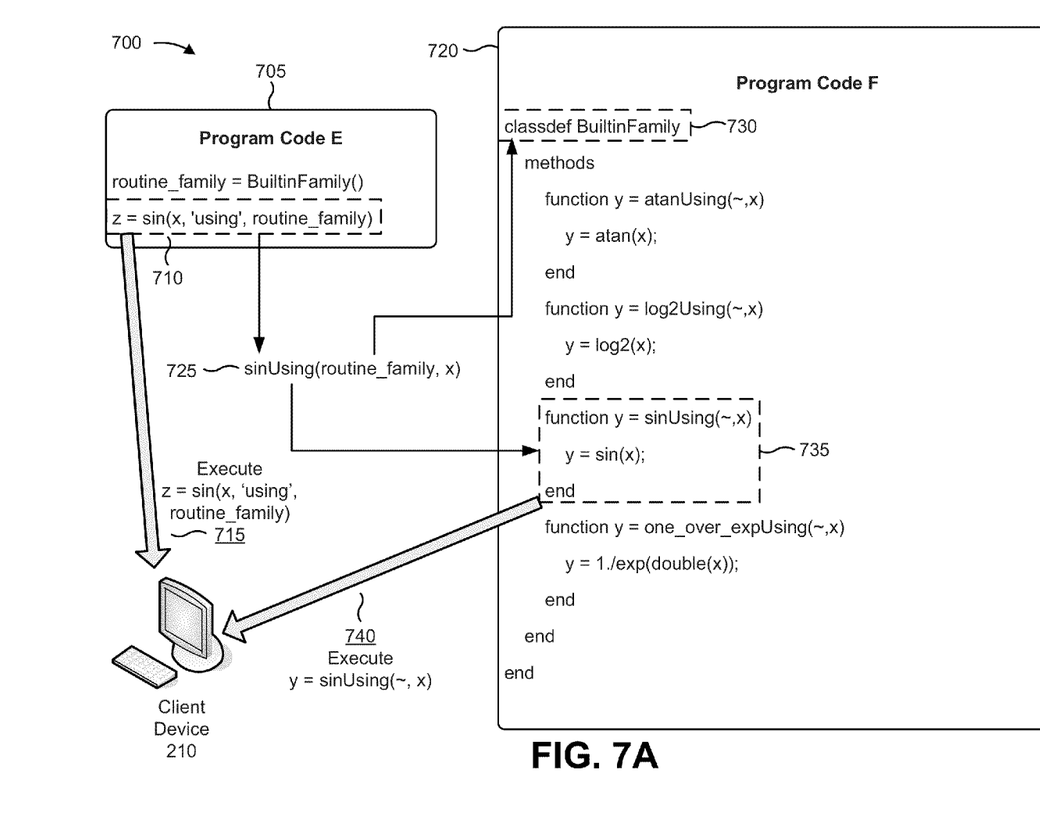
FIGS. 7A and 7B are diagrams of yet another example implementation relating to the example process shown in FIG. 4.
Figure 7B:
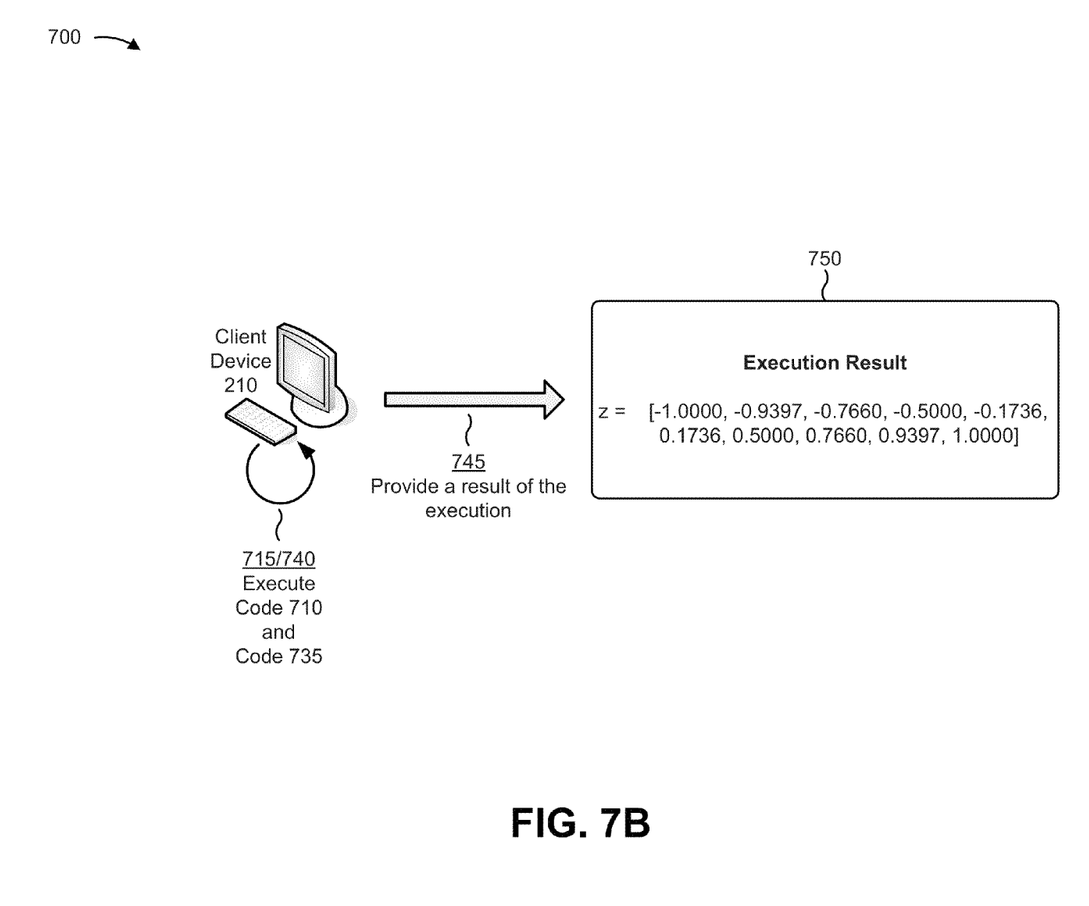

FIGS. 7A and 7B are diagrams of yet another example implementation 700 relating to example process 400 shown in FIG. 4. Implementation 700 shows another example of first program code and second program code (e.g., Program Code E and Program Code F) that may be executed by client device 210 to generate a result.

As shown in FIG. 7A, client device 210 may obtain first code 705 (e.g., first program code), shown as Program Code E. Assume that Program Code E includes the following code statement:

routine_family=BuiltinFamily( ), which may store an instance of the BuiltinFamily class in the variable routine_family.

Further assume that Program Code E includes code statement 710, which includes a function (sin), an input argument (x), a sentinel ('using') and a class identifier (routine_family), which represents an instance of class BuiltinFamily. Code statement 710 may be represented as follows:

z=sin(x, 'using', routine_family).

As shown by reference number 715, client device 210 may execute code statement 710, which may cause client device 210 to obtain second code 720 (e.g., second program code), shown as Program Code F. Client device 210 may convert code statement 710 to code statement 725, sin Using(routine_family, x), to call the sinUsing routine in the BuiltinFamily class (e.g., of which routine_family is a class instance) of second code 620. For example, the routine_family class identifier may identify the BuiltinFamily class of second code 620 (e.g., classdef BuiltinFamily), as shown by code statement 730. Further, the sin and/or sinUsing function may identify the sinUsing routine of second code 720 (e.g., function y=sinUsing(~, x)), as shown by code statement 735.

As shown by reference number 740, client device 210 may execute code statement 735, represented as:

function y=sinUsing(~, x)
  y=sin(x)
end.

As shown in FIG. 7B (reference number 745), client device 210 may provide a result of the execution. For example, client device 210 may provide a value for the variable z, via a user interface, as shown by reference number 750. As shown, z may be represented as an array of ten values that represent the sine of the ten evenly spaced values of the array represented by the input argument x. As shown, an output for z may be represented as:

z=[-1.0000, -0.9397, -0.7660, -0.5000, -0.1736, 0.1736, 0.5000, 0.7660, 0.9397, 1.0000].

Note that output 750 provides more accurate values, for the sine of the ten evenly spaced values of the array represented by input argument x, than does output 650. This is due to implementation 700 using a more accurate routine (e.g., code statement 735) than implementation 600 (e.g., code statement 635). However, execution of code statement 735 in implementation 700 may require more computing resources than execution of code statement 635 in implementation 600. As can be seen, two different devices may execute the same code statement (e.g., z=sin(x, 'using', routine_family)), but may generate different results (e.g., outputs 650 and 750) and/or may use different amounts of computing resources to generate the results. The generated result and/or the amount of computing resources used may depend on, for example, the routine used to generate the result (e.g., a polynomial approximation routine or a default sine routine).

Thus, implementations described herein allow a computer programmer to create program code that can be flexibly applied to a large number of devices by separating functions, included in the program code, from routines that specify a data type and/or an algorithm to use when executing the functions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      obtain first program code that identifies:
         a function,
         an input argument to which the function is to be applied when the one or more processors execute the first program code, and
         a class identifier that identifies second program code that includes a set of routines,
            the class identifier being based on:
               a type of the device, and
               an amount of computing resources available to the device,
            the set of routines including a routine that identifies a manner in which a return value of the function is to be generated, when the one or more processors execute the first program code,
            the second program code being stored separately from the first program code;
      execute the first program code;
      obtain the second program code based on executing the first program code;
      execute, based on obtaining the second program code, the routine to generate the return value, based on the function, the input argument, and the class identifier; and
      provide the return value based on executing the routine.

2. The device of claim 1,
   the first program code being stored in a first file,
   the second program code being stored in a second file, and
   the first file being different from the second file.

3. The device of claim 1, where the one or more processors, when executing the routine to generate the return value, are further to:
   generate the return value as a same data type as the input argument.

4. The device of claim 1, where the set of routines correspond to a related set of algorithms for executing different functions; and
   where the one or more processors, when executing the routine to generate the return value, are further to:
      execute the routine identified by the class identifier and the function.

5. The device of claim 1, where the one or more processors, when executing the first program code, are further to:
   convert the first program code to converted code; and
   execute the converted code; and
   where the one or more processors, when obtaining the second program code, are further to:
      obtain the second program code based on executing the converted code.

6. The device of claim 1,
the input argument including a first array of values,
the return value including a second array of values, based on the first array of values, and
the first array of values being a same data type as the second array of values.

7. The device of claim 1, where the one or more processors are further to:
generate the class identifier based on:
the type of the device, and
the amount of the computing resources available to the device.

8. A computer-readable medium storing instructions, the instructions comprising:
one or more instructions that, when executed by a processor, cause the processor to:
execute first program code, stored in a first storage location, that includes:
a function,
an input argument to which the function is to be applied when the processor executes the first program code, and
a class identifier associated with second program code, stored in a second storage location, that is to be executed when the processor executes the first program code,
the class identifier being based on an amount of computing resources available to the processor,
the second program code including a routine associated with the function,
the routine identifying a manner in which a return value of the function is to be generated when the processor executes the second program code;
execute the second program code, including the routine, based on executing the first program code;
generate the return value, based on executing the second program code, by applying the routine to the input argument; and
provide the return value based on generating the return value.

9. The computer-readable medium of claim 8,
the first program code being stored in a first file,
the second program code being stored in a second file and on a server device separate from a device that stores the first file, and
the first file being different from the second file.

10. The computer-readable medium of claim 8, where the one or more instructions, that cause the processor to generate the return value, further cause the processor to:
generate the return value as a same data type as the input argument.

11. The computer-readable medium of claim 8, where the second program code includes a set of routines corresponding to a related set of algorithms for executing different functions,
the set of routines including the routine; and
where the one or more instructions, that cause the processor to execute the second program code, further cause the processor to:
execute the routine, of the set of routines, based on the function.

12. The computer-readable medium of claim 8, where the one or more instructions, that cause the processor to execute the first program code, further cause the processor to:
convert the first program code to converted code; and
execute the converted code; and where the one or more instructions, that cause the processor to execute the second program code, further cause the processor to:
execute the second program code based on executing the converted code.

13. The computer-readable medium of claim 8,
the input argument including a first array of values,
the return value including a second array of values, based on the first array of values, and
the first array of values being a same data type as the second array of values.

14. The computer-readable medium of claim 8, where the instructions further comprise one or more instructions that, when executed by the processor, cause the processor to:
generate the class identifier based on:
a type of device associated with the processor, and
the amount of the computing resources available to the processor.

15. A method, comprising:
determining information associated with a device,
the determining being performed by the device;
generating, based on the information associated with the device, a class identifier that identifies program code that includes a routine associated with a function to be executed by the device,
the information associated with the device including at least one of:
a type of computing resource available to the device, or
an amount of the computing resource available to the device,
the generating the class identifier being performed by the device;
receiving other program code that includes:
the function,
the class identifier, and
an input argument to which the function is to be applied when the device executes the other program code,
the receiving the other program code being performed by the device;
receiving the program code that includes the routine associated with the function,
the routine identifying a manner in which a return value of the function is to be generated from the input argument, when the device executes the program code,
the program code being stored separately from the other program code,
the receiving the program code being performed by the device;
executing the other program code and the program code including the routine,
the executing the other program code and the program code being performed by the device;
generating the return value based on executing the other program code and the program code,
the generating the return value being performed by the device; and
providing the return value based on generating the return value,
the providing being performed by the device.

16. The method of claim 15,
the other program code being stored in a first file,
the program code being stored in a second file on a server device remote from the device, and
the first file being different from the second file.

17. The method of claim 15, where generating the return value further comprises:

generating the return value as a same data type as the input argument.

18. The method of claim 15, where executing the other program code and the program code comprises:
converting the other program code to converted code;
executing the converted code; and
executing the program code based on executing the converted code.

19. The method of claim 15,
the input argument including a first array of values,
the return value including a second array of values, based on the first array of values, and
the first array of values being a same data type as the second array of values.

20. The method of claim 15, where the information associated with the device includes at least two of:
a type of the device;
the type of the computing resource available to the device; or
the amount of the computing resource available to the device.

\* \* \* \* \*